[11] 3,550,523

United States Patent

| [72] | Inventor | Irving Segal<br>Royal Oak, Mich. |
|---|---|---|
| [21] | Appl. No. | 823,868 |
| [22] | Filed | May 12, 1969 |
| [45] | Patented | Dec. 29, 1970 |
| [73] | Assignees | Richard T. Coe<br>Livonia, Mich.<br>a part interest;<br>Jacob E. Saari<br>Southfield, Mich., a part interest |

[54] SEAT CONSTRUCTION FOR AUTOMOTIVE AIR CONDITIONING
7 Claims, 5 Drawing Figs.

[52] U.S. Cl. .................................................. 98/2, 62/261
[51] Int. Cl. .................................................. B60h 1/24
[50] Field of Search .......................................... 62/261; 98/2(Sert Digest)

[56] References Cited
UNITED STATES PATENTS
| 2,782,834 | 2/1957 | Vigo | 62/261 |
| 2,826,135 | 3/1958 | Benzick | 98/Sert Digest |

FOREIGN PATENTS
| 880,081 | 10/1961 | Great Britain | 98/Sert Digest |

Primary Examiner—Meyer Perlin
Attorney—Harness, Dickey & Pierce

ABSTRACT: An automobile seat and seat back have foam rubber paddings, with a multipassage plenum chamber formed in the interior of each pad. Intake passages connect this chamber to the air conditioning system, and small holes in the cover material are connected to the plenum chamber by outlet passages in the foam rubber so that cool air will issue directly onto passengers on the seat. The plenum chamber is formed either by cored channels which crisscross, or cylindrical molded supports connecting spaced portion of the foam rubber.

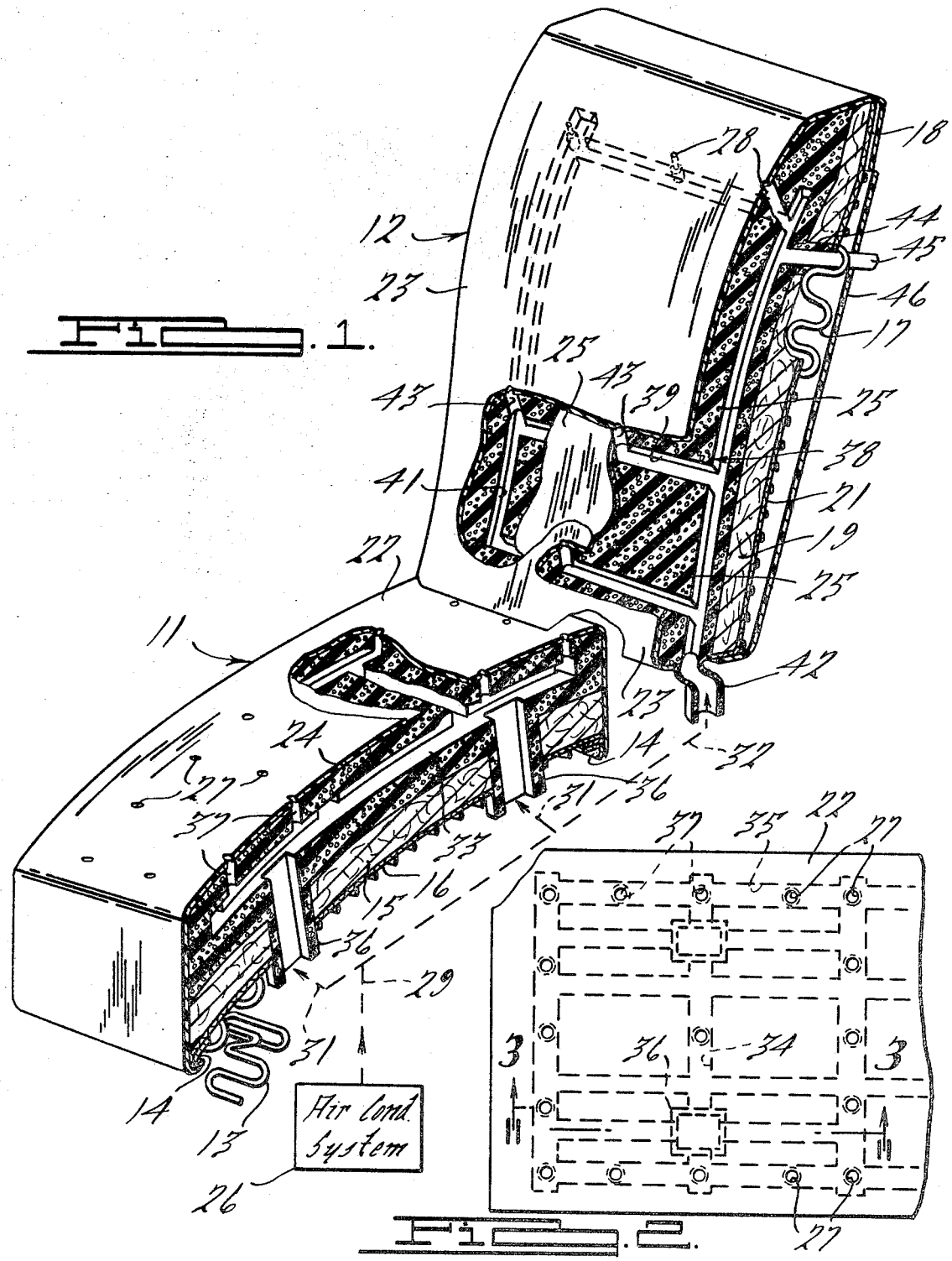

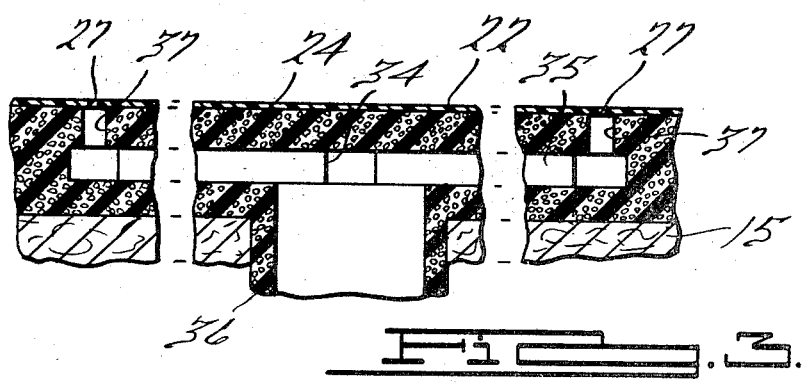
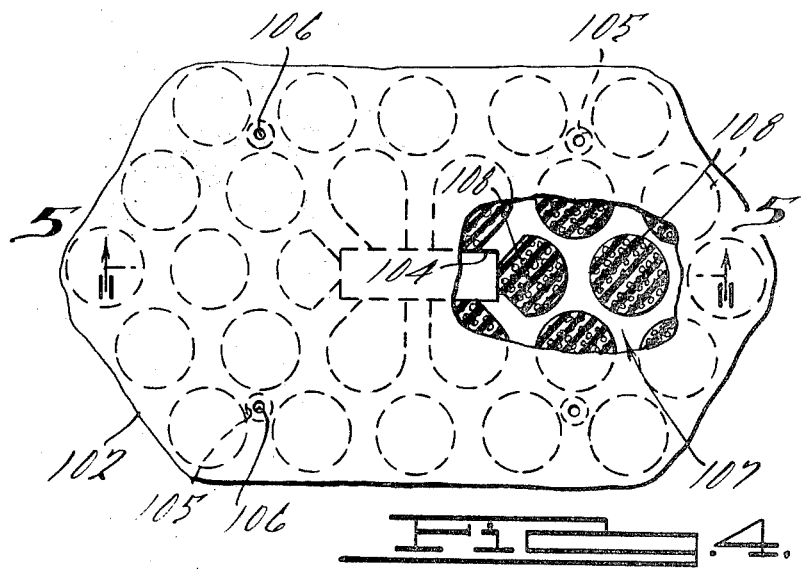
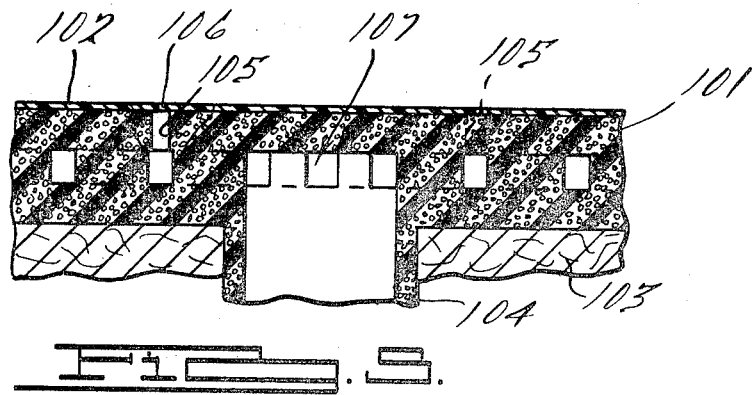
INVENTOR.
Irving Segal.
BY
Harness, Dickey & Pierce
ATTORNEYS.

SEAT CONSTRUCTION FOR AUTOMOTIVE AIR CONDITIONING

BACKGROUND OF THE INVENTION

1. Field of the Invention

The invention relates to automotive air conditioning systems, and more particularly to a seat and seat back construction by means of which cool air is conducted directly onto passengers through the upholstery. The invention is particularly useful in cars having vinyl or leather upholstery, which often create considerable discomfort due to their lack of porosity. The invention has particular application to the popular foam padded seat and seat back construction.

2. Description of the Prior Art

U.S. Pat. No. 2,493,303 and 2,782,834 show means for conducting cooled air to the seat and seat back of a furniture article. U. S. Pat. No. 2,912,832 describes cooling apparatus to be connected to a vehicle seat, and other patents such as U.S. Pat. No. 3,370,520 show ventilating devices to be placed on automobile seats. However, none of the known prior art has a construction whereby conditioned air may be carried directly through the foam rubber cushioning of an automobile seat and seat back and the vinyl or other covering thereof, at a number of spaced points spread over the area on which the passengers recline.

BRIEF SUMMARY OF THE INVENTION

According to the invention, the foam rubber paddings of the seat and seat back are provided with plenum chambers extending substantially throughout the length and width of the paddings. These plenum chambers in one embodiment of the invention comprise cored passages in perpendicular directions and connected at their intersections. In the second embodiment, the plenum chamber has a plurality of molded cylindrical supports connecting spaced portions of the foam rubber padding.

The lower portions of the paddings have suitable connections which receive cooled air from the air conditioning system. The air flows into and through the plenum chambers, and outlet passages lead to the undersurface of the vinyl or other upholstery. The latter is provided with small holes through which the cooled air will issue.

Additional outlet connections are provided from the plenum chamber to the rear of the front seat back. Adjustable air directors are carried by the front seat back for the benefit of rear seat passengers.

BRIEF DESCRIPTION OF THE DRAWINGS

FIG. 1 is a partial cross-sectional perspective view showing an automotive front seat and seat back incorporating the invention;

FIG. 2 is a partial plan view of the seat showing the layout of the cored passages;

FIG. 3 is a fragmentary cross-sectional view taken along the line 3–3 of FIG. 2 and further showing the arrangement of the plenum chamber passage;

FIG. 4 is a view similar to FIG. 2 but with parts broken away, showing a second embodiment of the plenum chamber construction; and FIG. 5 is a fragmentary cross-sectional view taken along the line 5–5 of FIG. 4 and showing the manner in which the cylindrical connectors extend between the spaced portions of the foam rubber padding.

DESCRIPTION OF THE PREFERRED EMBODIMENTS

Referring first to the embodiments of FIGS. 1 to 3, an automobile front seat generally indicated at 11 and a seat back generally indicated at 12 are shown in section. It should be understood of course that the principles of this invention apply to rear seats as well as front seats of automobiles. The seat has the usual springs 13 attached to a frame 14 and cotton batting 15, burlap 16 being disposed between the batting and springs. Similarly, seat back 12 has springs 17 attached to a frame 18, cotton batting 19, and burlap 21 between the cotton batting and springs. Seat 11 and seat back 12 are provided with covers 22 and 23 respectively. The cover material is shown as being a vinyl plastic although it could be a suitable fabric.

Foam rubber padding 24 is disposed between cotton batting 15 and cover 22 of seat 11. Similarly, foam rubber padding 25 is disposed between batting 19 and cover 23 of seat back 12. Both paddings 24 and 25 are constructed, in accordance with the invention, in such manner as to provide means for conducting cooled air from an air-conditioning system 26 to small holes 27 in cover 22 and similar holes 28 in cover 23. The holes are in rows spaced along the covers in such manner as to include substantially all the areas on which the driver or other passengers may recline during travel.

Air-conditioning system 26 is of the conventional type installed in automotive vehicles, and has conduits schematically indicated at 29, 31 and 32 which lead to foam rubber paddings 24 and 25. In the case of a front seat, conductors 31 and 32 may be flexible so as to permit seat adjustment.

Padding 24 has a plenum chamber generally indicated at 33. This chamber is composed of a plurality of front-to-back passages 34 and a left to right passages 35, as seen in FIG. 2. These passages are connected at their points of intersection and are aligned with the rows of holes 27 in seat cover 22. A plurality of air intakes 36 are formed on the foam rubber padding, as shown in FIGS. 1 and 3, these intakes extending downwardly and being connected to conduits 31 of the air-conditioning system. Intakes 36 extend through the cotton batting 15 and springs 13 for this purpose. A plurality of air outlets 37 are formed in padding 24, these outlets leading from passages 34 and 35 to holes 27.

A plenum chamber generally indicated at 38 is formed in padding 25 of seat back 12. As in the case of chamber 33, this plenum chamber is composed of a plurality of left-to-right passages 39 and top-to-bottom passages 41 which are connected at their intersections. Intakes 42 are provided for connection to conduits 32, and air outlets 43 are formed in the padding which lead to holes 28.

In operation, cooled air flowing from air-conditioning system 26 will be delivered to intakes 36 and 42 and will pass through plenum chambers 33 and 38 respectively to air outlets 42 and 43 and holes 27 and 28 in the seat and seat back covers. Thus a person or persons sitting on the seat will be directly cooled by this air, reducing discomfort particularly where vinyl covers are used.

Several conduits 44 are provided which lead from padding 25 in the seat back toward the rear passage compartment. Passages 44 lead from plenum chamber 38 and thus will conduct cooled air toward the rear passengers. An adjustable air director 45 or similar accessory may be provided which extends from cover material 46 on the rear of the seat back, so that the rear seat passengers may select the direction of air flow. In this manner, cooled air may be delivered directly to the rear passenger compartment, utilizing the same airflow means which delivers cooled air to the surface of the seat back itself.

FIGS. 4 and 5 show a second embodiment of the invention which is similar to the first but in which the plenum chamber is somewhat differently constructed. In this embodiment, the foam rubber padding is indicated at 101 and is disposed between vinyl cover 102 and cotton batting 103. The foam rubber has a plurality of air intakes 104 and outlets 105 which lead to holes 106 in cover 102.

The plenum chamber is generally indicated at 107 and, as in the previous embodiment, extends through the foam rubber padding under all the holes 106. However, in this case the plenum chamber has a plurality of cylindrical molded supports which extend between the two layers of padding on opposite sides of the plenum chamber. These supports are indicated at 108 and, as seen in FIG. 4, split up plenum chamber 107 into a number of passages going in various directions. In the vicinity of air intakes 104, supports 108 are of slightly different shape to properly form the plenum passages.

I claim:

1. In an automotive vehicle seat construction of the type having a seat cover and a foam rubber padding, a plenum chamber extending through the entire padding, said plenum chamber comprising a plurality of continuous passages with foam rubber padding material between said passages which form spaced supports extending between the padding on opposite sides of the all of said passages having the full height of said plenum chamber, air intake passages extending in one direction from said plenum chamber and connected to the outlet of an automotive air-conditioning system, a plurality of air outlets leading from said plenum chamber toward the seat cover, said outlets being distributed evenly over the area of said seat cover, and a plurality of holes in the seat cover aligned with and receiving air from said air outlets.

2. The combination according to claim 1, said plenum chamber comprising a plurality of spaced parallel passages extending from side to side of the seat and a plurality of spaced parallel passages extending from front to back of the seat, said passages being connected at their intersections.

3. The combination according to claim 1, said supports being cylindrical in shape.

4. In a front seat and seat back construction for automotive vehicles of the type having seat and seat back covers and foam rubber paddings in the seat and seat back, said paddings having plenum chambers extending through the entire paddings substantially along the areas where passengers will be seated, the plenum chambers each comprising a plurality of continuous passages with foam rubber padding material between said passages which form spaced supports extending between the padding on opposite sides of the chamber, all of said passages having the full height of said plenum chambers, a plurality of air intakes extending downwardly from said plenum chambers and having connections to the outlet of an automotive air-conditioning system, a plurality of air outlets extending from said plenum chambers toward the covers of said seat and seat back, which form spaced supports extending between the padding on opposite sides of the chamber, all of said passages having the full height of said plenum chambers, and a plurality of holes in said seat and seat back covers aligned with and receiving air issuing from said outlets.

5. The combination according to claim 4, said connections being flexible whereby the seat and seat back may be adjusted.

6. In a front seat and seat back construction for automotive vehicles, foam rubber paddings in the seat and seat back, said paddings having plenum chambers extending substantially along the areas where passengers will be seated, the plenum chambers each comprising a plurality of passages with foam rubber padding material between said passages, a plurality of air intakes extending downwardly from said plenum chambers and having connections to the outlet of an automotive air-conditioning system, said connections being flexible whereby the seat and back may be adjusted, a plurality of air outlets extending from said plenum chambers toward the covers of said seat and seat back, a plurality of holes in said seat and seat back for receiving air issuing from said outlets, and at least one outlet extending rearwardly from the seat back plenum chamber through the back cover of the seat back.

7. The combination according to claim 6, further provided with an adjustable air director at the exit of said last mentioned outlet.

PO-1050
(5/69)

UNITED STATES PATENT OFFICE
CERTIFICATE OF CORRECTION

Patent No. 3,550,523      Dated December 29, 1970

Inventor(s) Irving Segal

It is certified that error appears in the above-identified patent and that said Letters Patent are hereby corrected as shown below:

Column 1, line 58, "passage" should read -- passages --
Column 3, line 8, after "the" (first occurrence) insert -- chamber, --.

SIGNED AND SEALED
MAR 9 1971

(SEAL)
Attest:

Edward M. Fletcher, Jr.
Attesting Officer

WILLIAM E. SCHUYLER, J
Commissioner of Patents